Dec. 29, 1964    H. T. WHITE    3,163,790
MOTOR DRIVEN PUMPS
Filed Nov. 10, 1961

INVENTOR.
HOWARD T. WHITE
BY
ATTORNEY

United States Patent Office 3,163,790
Patented Dec. 29, 1964

3,163,790
MOTOR DRIVEN PUMPS
Howard T. White, Melrose Park, Pa., assignor to Fostoria Corporation, Warrington, Pa., a corporation of Ohio
Filed Nov. 10, 1961, Ser. No. 151,500
10 Claims. (Cl. 310—54)

This invention relates to motor driven pumps and more particularly to improved cooling provisions therefor.

In the operation of motor driven pumps, particularly for pumping fluids at elevated temperatures it is necessary to prevent excessive temperatures being attained in the motor stator windings as well as in the motor bearings. It has heretofore been proposed to provide a jacket around the motor stator to cool the same and to circulate fluid around the bearings and in the clearance space between the motor stator and the motor rotor. No wholly satisfactory provisions have heretofore been made for cooling this circulating fluid.

It is the principal object of the present invention to provide an improved motor driven pump for operation at high temperatures with internal circulation of cooling fluid.

It is a further object of the present invention to provide a motor driven pump for high temperature fluid pumping having a heat exchanger of simple but effective type incorporated therein for cooling internally circulated cooling fluid.

It is a further object of the present invention to provide a motor driven pump for high temperature fluid pumping having a heat exchanger incorporated therein for cooling internally circulated cooling fluid in which the heat exchanger can be built as a unit and on a motor housing end closure for easy assembly and disassembly.

It is a further object of the present invention to provide a motor driven pump for high temperature fluid pumping having provisions for circulating an internal cooling fluid which can, if desired, be separated from the fluid being pumped and which can be cooled by another fluid in heat exchange relation therewith.

Other objects and advantageous features of the invention will be apparent from the description and claims.

The nature and characteristic features of the invention will be more readily understood from the following description, taken in connection with the accompanying drawings forming part thereof, in which:

FIG. 1 is a view partly in elevation and partly in vertical section of a preferred form of motor driven pump in accordance with the invention;

FIG. 2 is fragmentary transverse vertical sectional view taken approximately on the line 2—2 of FIG. 1;

FIG. 3 is a transverse vertical section taken approximately on the line 3—3 of FIG. 1, and FIG. 4 is an enlarged fragmentary view partly in elevation and partly in longitudinal section of a heat exchanger tube and its fins as employed in connection with the invention.

It should, of course, be understood that the description and drawings herein are illustrative merely, and that various modifications and changes may be made in the structure disclosed without departing from the spirit of the invention.

Referring now more particularly to the drawings, a pump housing 10 is provided, of generally cylindrical shape and having in the interior thereof a pump chamber 11. A fluid inlet connection 12 is provided, at the center of the housing 10 and longitudinally axially thereof, communicating with the pump chamber 11. A fluid delivery connection 13 for the fluid being pumped is provided tangentially connected to the pump chamber 11 for delivery of fluid from the chamber 11.

The pump housing 10 has an end closure plate 14 with an annular recess 15 which is held in assembled relation to a shoulder 16 on the pump housing 10 by bolts 17 which extend into blind threaded holes 18 in the pump housing 10. An annular packing 20 can be provided for preventing fluid leakage.

The end closure plate 14 has a hollow cylindrical neck 21 secured thereto in any desired manner, such as by welding, and the neck 21 extends into and beyond an end mounting plate 22 to which it is secured in any desired manner, such as by welding.

The motor housing includes an outer cylindrical motor housing section 25 with opposite motor housing end closure plates 26 and 27 secured thereto in any desired manner, such as by welding. The end closure plates 26 and 27 have central openings 28 for the reception of the ends of a cylindrical sleeve 30 which are secured thereto in fluid tight relation in any desired manner, such as by welding. The sleeve 30 is of non-magnetic responsive material, such as stainless steel, and serves with the housing section 25 and the end closure plates 26 and 27 to provide an externally disposed isolated motor stator chamber 31, and also to provide an interior motor rotor chamber 29.

A motor stator winding 32 and stator laminations 33 can be provided on the sleeve 30. Reinforcing and strengthening rings 34 can be provided on the sleeve 30 between the laminations 33 and the plates 26 and 27.

The winding 32 can be connected by conductors 35 which extend through a sealed connector 36 to any suitable source of alternating current.

The mounting plates 22 and neck 21 have the end closure plate 26 secured in position with respect thereto by bolts 37 which extend into blind holes 38 in the end closure plate 26. A packing 39 can be provided between the plates 22 and 26 for preventing fluid leakage at this location.

The end closure plate 27 has secured in position with respect thereto a heat exchanger mounting plate 40 which is seated in a groove 41 in the plate 27 and has a collar portion 42 extending within the sleeve 30. The mounting plate 40 is held in position by a holding ring 43, a packing 44 being interposed between the plate 40 and the ring 43. A plurality of bolts 45 extending through the ring 43 and into engagement in blind threaded holes 46 in the plate 27 retain the ring 43, packing 44 and plate 40 in position.

The neck 21 has in the interior a bearing sleeve 47 which includes an outer metal collar 48 and inner cylindrical bearing collar 49 of carbon or the like. The sleeve 47 is retained in position by a set screw 50 and has a plurality of longitudinal slots 51 and radial end passageways 52 communicating therewith for fluid flow.

The mounting plate 40 also has a bearing sleeve 53 which is retained in position against a shoulder 54 by a set screw 55.

A hollow shaft 60 is provided journalled in the bearing sleeves 47 and 53 and has a fluid impeller 61 secured thereto and disposed in the impeller chamber 11. The end of the shaft 60 in the impeller chamber 11 is preferably closed by a plug 62.

The shaft 60 in the motor rotor chamber has a motor rotor 64 secured thereto for rotation therewith. The motor rotor 64 can be of the short circuited type and is preferably enclosed within a fluid tight enclosure 65 which is secured to the shaft 60. The clearance at 66 between the rotor enclosure 65 and the sleeve 30 serves for cooling fluid flow as hereinafter explained.

The shaft 60, at the outer end of the bearing sleeve 47 has one or more openings 67 therethrough for fluid delivery to the radial end passageways 52 and slots 51 and an impeller ring 68 is mounted on the shaft 60 at the inner end of the bearing sleeve 47, and against a shoulder 69 on the shaft 60. The ring 68 has a plurality of radial openings 70 for fluid discharge and for effecting cooling fluid flow.

The heat exchanger mounting plate 40 has a heat exchanger casing 72 preferably of cylindrical shape secured thereto in any desired manner, such as by welding. The casing 72 is closed at the outer end thereof by an end plate 73.

In the interior of the casing 72 a baffle 74 is provided which extends from the end plate 73 toward but terminates at a marginal edge 75 spaced from the mounting plate 40. The baffle 74 divides the interior of the casing 72 into two chambers 76 and 77, one of which such as the chamber 76 has a cooling fluid inlet connection 78, mounted on the end plate 73, connected thereto while the other chamber 77 has a cooling fluid delivery connection 79, mounted on the end plate 73, connected thereto. The fluid delivery connection 79 is connected by a pipe 80 to a fluid connection 81 communicating with the interior of a cylindrical jacket 82 mounted on the exterior of the motor housing section 25.

Within the interior of the jacket 82 a longitudinal baffle 83 is provided closely spaced with respect to the fluid connection 81 and for directing fluid around the interior of the jacket 82 for discharge through a discharge fluid connection 84 on the other side of the baffle 83.

The mounting plate 40 has extending therefrom and within the interior of the heat exchanger casing 72 a plurality of heat exchange tubes 86 of U-shape, each of which is provided along its length except at the turns with metal fins 87 for increasing the heat transfer action therein. One of the tubes 86 has an inlet connection 88 and outlet connection 89 through the mounting plate 40, and both on one side of the baffle plate 74 and the other tube 86 has an inlet connection 90 and outlet connection 91 through the mounting plate 40 and both on the other side of the baffle plate 74. The inlet connections 88 and 90 are in communication with the motor rotor chamber 29. The fluid delivery connections 89 and 91 are in communication through a connecting passageway 92 with the interior of the shaft 60 for fluid flow.

If desired, the neck 21 can have a filling fluid passageway 93 with a filling connection 94 communicating therewith. The filling connection 94 is preferably provided with a shut-off valve 95 for controlling the supply of fluid through the connection 94.

The mode of operation will now be pointed out.

The energization of the winding 32 is effective for establishing a rotating field in the stator laminations 33 which is effective for rotating the motor rotor 64 and the shaft 60 secured thereto. Rotation of the shaft 60 is effective for rotating the impeller 61 in the impeller chamber 11 for the delivery of fluid from the fluid inlet connection 12 to the fluid delivery connection 13.

Rotation of the shaft 60 is also effective for rotating the impeller ring 68 so that fluid entering the opposite end of the shaft 60 is delivered through the shaft 60, the openings 67, the passageways 52 and slots 51 to the impeller ring 68 and through the ring holes 70 to the motor rotor chamber 29 and thence through the clearance space 66 between the motor rotor enclosure 65 and the sleeve 30, thence through the inlet connections 88 and 90 to the interiors of the tubes 86 for cooling prior to its return through the delivery connections 89 and 91 to the end of the shaft 60.

It will be noted that the fluid in the course of its circulation is in heat exchange relation for cooling to the bearing sleeve 53, in cooling relation to the interior of the motor rotor 64, in cooling relation to the bearing sleeve 50, in cooling relation to the exterior of the motor rotor 64 and in cooling relation to the sleeve 30 interiorly of the laminations 33, this fluid passes for cooling to and through the heat exchange tubes 86. A continuous closed circuit for cooling fluid is thus provided which can be independent of the fluid being pumped by the impeller 61.

The heat exchange tubes 86 are cooled on the exteriors thereof by another cooling fluid introduced through the fluid inlet connection 78 on the end plate 73 which fluid passes in heat exchange relation first with one of the tubes 86, then around the end margin 75 of the baffle 74, then in heat exchange relation with the other of the tubes 86, then through the fluid delivery connection 79 on the end plate 73, through the pipe 80 to the fluid connection 81 on the exterior of the jacket 82, then within the interior of the jacket 82 as required by the baffle 83 to the fluid discharge connection 84 for discharge.

It will be noted that the heat exchanger comprises a removable unit which can be readily installed and disassembled if desired or required for inspection of the interior of the motor rotor chamber 29. At the same time the heat exchange unit is effective for providing the desired cooling action of the motor and preventing excessive temperature rise therein even with very high temperature fluid pumped through the impeller chamber 11.

The construction of the neck 21 with a restricted amount of material between the end closure plate 14 and the bearing sleeve 51 reduces the amount of metal for heat transfer from the pump to the motor and further aids in avoiding any undue temperature rise in the stator windings 32, motor rotor 64, and bearing sleeves 47 and 53.

I claim:

1. A heat exchange system for a motor driven pump having a motor housing with a cylindrical sleeve longitudinally axially mounted therein and separating a motor stator chamber from an interior motor rotor chamber, a motor rotor in said motor rotor chamber having a clearance with respect to said sleeve for cooling fluid flow, a shaft on which said motor rotor is mounted, said shaft having a central longitudinal passageway therein for cooling fluid flow, a motor housing closure at one end of said sleeve having a bearing for said shaft, a heat exchanger mounted on and longitudinally axially disposed with respect to said motor housing closure having heat exchange elements therein in communication with said motor rotor chamber and with the interior of said shaft longitudinally through said motor housing closure, a fluid connection for supplying fluid for cooling said heat exchange elements, a fluid delivery connection for the delivery of cooling fluid from said heat exchanger, and members interiorly disposed in said sleeve and contiguous to the other end of said sleeve for impelling fluid in said clearance and through said exchange elements and said shaft passageway.

2. The combination as defined in claim 1 in which said impelling members include an auxiliary impeller on said shaft in said motor rotor chamber in communication with said shaft passageway for circulation of the cooling fluid.

3. The combination as defined in claim 2 in which a radial bearing for said shaft is interposed between said shaft passageway and said auxiliary impeller.

4. The combination as defined in claim 1 in which said heat exchanger includes a heat exchanger housing secured to and extending longitudinally axially from said motor housing closure, said motor housing closure has heat transfer tubes secured thereto and extending therefrom into said heat exchanger housing, and said motor housing closure has inlet openings therethrough in communication with said motor rotor chamber and return openings in communication with said shaft passageway.

5. In a heat exchanger for a motor driven pump having a motor housing with an interior chamber, means for cooling fluid in said housing comprising a housing closure plate for closing an end of said housing having an outwardly extending mounting portion, a heat exchanger housing extending longitudinally from said housing closure plate, said housing closure plate having heat transfer tubes secured at their ends in said plate and extending into said heat exchanger housing, said housing closure having fluid inlet openings therethrough in communication with said chamber at one location and fluid flow openings in communication with said chamber at another location, and means for circulating another fluid in contact with said heat transfer tubes for heat transfer therefrom.

6. In a heat exchanger for a motor driven pump having a motor housing with an interior chamber and a shaft in said chamber with a longitudinal passageway, means for cooling fluid in said housing comprising a housing closure plate with a portion for closing an end of said housing, said shaft having a longitudinal passageway, a heat exchanger housing secured to said housing closure and extending longitudinally with respect to said shaft and from said housing closure plate, said housing closure plate having a radial bearing therein for supporting said shaft, heat transfer tubes mounted on said housing closure plate and extending into said heat exchanger housing, said housing closure plate having fluid flow openings therethrough in communication with said chamber and said tubes and fluid flow openings in communication with said shaft passageway and said tubes, and means for circulating another fluid in contact with said heat transfer tubes for heat transfer therefrom.

7. The combination defined in claim 6 in which an auxiliary impeller is provided on said shaft in said chamber in communication with said shaft passageway for circulation of the cooling fluid.

8. The combination defined in claim 6 in which said housing has a cooling jacket in surrounding relation thereto and said jacket has its interior connected to said last means.

9. A heat exchanger unit for motor driven pumps and the like comprising an end closure having a central outwardly extending mounting portion, a tubular extension on one side thereof with a radial shaft bearing carrying portion therein, said end closure having a heat exchanger housing extending from the opposite side thereof, said end closure having spaced openings therethrough for ingress and egress of fluid to be cooled, a plurality of heat exchange tubes mounted on said end closure and extending into said housing in connected relation to said openings, a fluid connection connected to said heat exchanger housing for supplying fluid for cooling said heat exchange tubes, and a fluid delivery connection for the delivery of the supplied fluid from said heat exchanger housing.

10. The combination defined in claim 9 in which said heat exchange tubes are U-shaped with their major dimension parallel to the longitudinal axis of said housing, the interior of said housing has a longitudinal baffle plate, and heat exchange tubes are disposed on opposite sides of said baffle.

References Cited by the Examiner

UNITED STATES PATENTS

| 2,301,113 | 11/42 | Ettington | 165—158 X |
| 2,556,435 | 6/51 | Moehrl | 310—54 X |
| 2,870,997 | 1/59 | Soderstrom | 165—158 X |
| 2,951,165 | 8/60 | Artunoff | 310—54 |
| 2,964,659 | 12/60 | Steele | 103—87 |

FOREIGN PATENTS

| 118,109 | 3/59 | Russia. |

MILTON O. HIRSHFIELD, *Primary Examiner.*

LAWRENCE V. EFNER, DAVID X SLINEY,
*Examiners.*